FOWLER & BACON.
Broadcast-Seeder.
No. 22,418.  Patented Dec. 28, 1858.
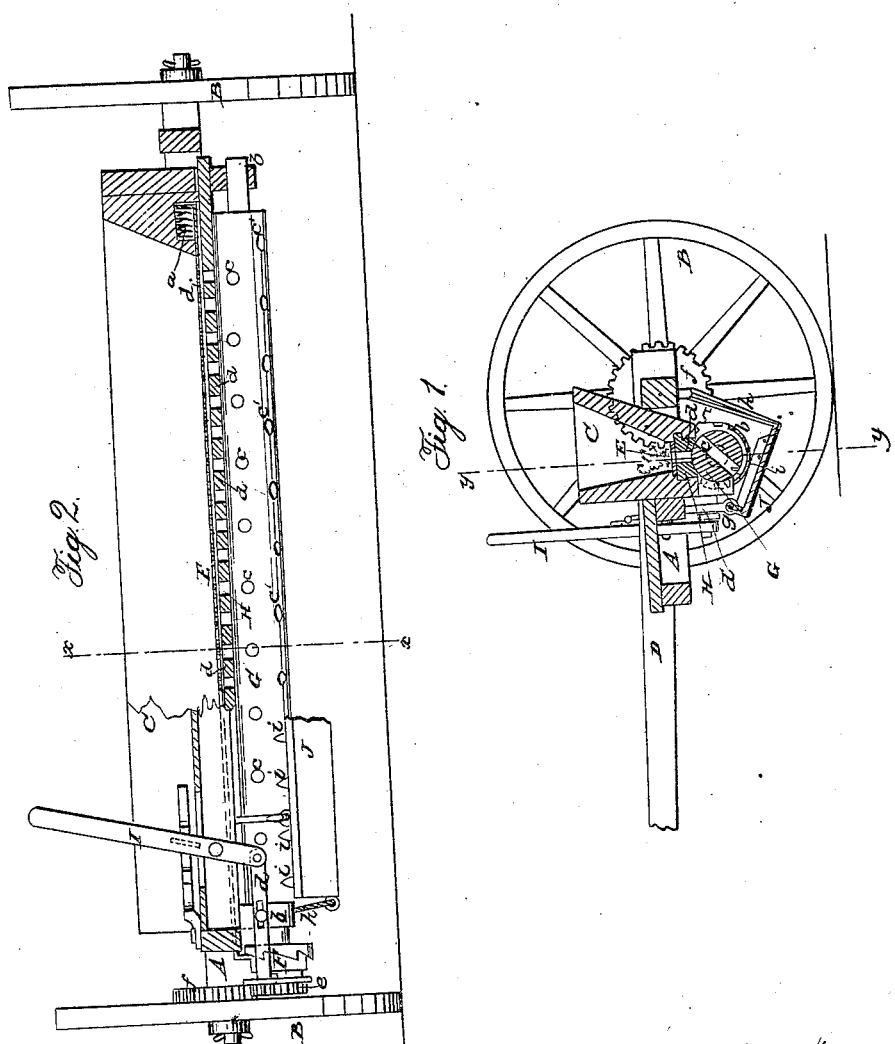
Witnesses:
M. Salisbury
George Salisbury
Inventor:
Joseph Fowler
F. M. Bacon

UNITED STATES PATENT OFFICE.

JOS. FOWLER AND F. M. BACON, OF RIPON, WISCONSIN.

IMPROVEMENT IN SEEDING-MACHINES.

Specification forming part of Letters Patent No. 22,418, dated December 28, 1858.

*To all whom it may concern:*

Be it known that we, JOSEPH FOWLER and F. M. BACON, of Ripon, in the county of Fond du Lac and State of Wisconsin, have invented a new and useful Improvement in Seeding-Machines; and we do hereby declare that the following is a full, clear, and exact description of the same, reference being had to the annexed drawings, making a part of this specification, in which—

Figure 1 is a transverse vertical section of our invention, taken in the line $x\ x$, Fig. 2. Fig. 2 is a longitudinal vertical section of the same, taken in the line $y\ y$, Fig. 1.

Similar letters of reference indicate corresponding parts in the two figures.

This invention relates to an improvement on a seeding-machine formerly patented by us, the Letters Patent bearing date August 24th, 1858.

The within-described invention relates to an improvement in the seed-distributing device whereby the seed may be more evenly distributed or planted than by the patented machine above alluded to.

To enable those skilled in the art to fully understand and construct our invention, we will proceed to describe it.

A represents a rectangular frame, which is mounted on two wheels, B B, and has a seed-box, C, placed upon it, extending its whole length, as shown in Fig. 2. To the front part of the frame A a draft-pole, D, is attached. The bottom of the seed-box C is formed of a perforated slide, E, which is filled in the hopper, so as to admit of a longitudinal vibration or reciprocating movement. This slide has a spiral spring, $a$, acting against it at one end, and the opposite end at the outer side of the seed-box is bent down a short distance, and is acted upon by a ratchet-shaped cam, F, which is attached to one end of a roller, G, said roller being fitted in proper bearings, $b\ b$, at the under side of the seed-box, and extending the whole length of the seed-box. The roller G is perforated with holes $c\ c'$, which extend entirely through it transversely, the holes $c$ being at points in line with the centers of the spaces between the holes $c'$, as shown clearly in Fig. 2.

H is a slide, which is perforated with holes $d$, corresponding to the holes in the reciprocating slide E. The slide H is stationary, and is fitted in the seed-box C below the reciprocating slide E, and the under surface of the slide H is made concave so that the roller G may work into it snugly, as shown clearly in Fig. 1. The roller G is allowed to slide longitudinally a certain distance in its bearings $b\ b$, and the lower end of a lever, I, which is pivoted in the frame A, is connected to one end of the roller G by an arm, $d'$, as shown clearly in Fig. 2. The roller G has a pinion, $e$, on it adjoining the cam F, and to the inner side of one of the wheels B a toothed wheel, $f$, is attached.

J is an inclined board, which is suspended by rods $g$ and cords $h$ from the frame A. This board extends the whole length of the roller G, and has cleats $i$ attached transversely to its upper surface, the board inclining downward from its front to its back end, as shown clearly in Fig. 1.

The operation is as follows: As the implement is drawn along a reciprocating movement is given the slide E by means of the cam F and spring $a$, and the roller G is rotated by the gearing $e\ f$. When the holes in the slide E register with the holes $d$ in the slide H the holes $d$ fill with seed, and neither the holes $c$ nor $c'$ in the roller G are in line or register with the holes $d$; but when the holes in the slide E are moved out of register with the holes $d$ the holes $c\ c'$ pass alternately in register with said holes, and the seed is discharged through said holes on the board J, which scatters or distributes the seed on the ground in an even broadcast manner.

It will be seen from the foregoing description that the perforated slide H serves as a measure and insures an even or uniform discharge of seed.

The distributing device may be thrown out of gear at any time by actuating the lever I, the roller G being thereby moved and the pinion $e$ thrown out of gear with the wheel $f$.

We do not claim the board J nor the roller G, for they have been previously used, and may be seen in our patented machine previously alluded to; but,

Having thus described our invention, what we claim as new, and desire to secure by Letters Patent, is—

The reciprocating perforated slide E, stationary perforated slide H, and perforated roller G, in connection with the inclined board J, the whole being arranged to operate as and for the purpose set forth.

JOSEPH FOWLER.
F. M. BACON.

Witnesses:
W. BROWN,
KEYES LINDSEY.